United States Patent [19]
Pringle

[11] 3,974,897
[45] Aug. 17, 1976

[54] BRAKE ACTUATOR ASSEMBLY

[75] Inventor: William L. Pringle, Grosse Pointe Shores, Mich.

[73] Assignee: United States Steel Corporation, Pittsburgh, Pa.

[22] Filed: Apr. 11, 1975

[21] Appl. No.: 567,126

[52] U.S. Cl. .......................... 188/196 A; 188/71.8; 188/72.8
[51] Int. Cl.² ........................................ F16D 65/74
[58] Field of Search ............... 188/71.8, 72.7, 72.8, 188/196 A, 351, 72.6; 60/543, 590; 192/111 A

[56] References Cited
UNITED STATES PATENTS

| | | | |
|---|---|---|---|
| 2,817,419 | 12/1957 | Wolf | 188/196 A X |
| 3,548,989 | 12/1970 | Root | 192/111 A |
| 3,643,763 | 2/1972 | Hay | 188/196 A X |
| 3,664,468 | 5/1972 | Oka | 188/351 X |

Primary Examiner—George E. A. Halvosa
Attorney, Agent, or Firm—McGlynn and Milton

[57] ABSTRACT

A self-contained brake actuator assembly including a cylinder, an actuated piston within the cylinder, an actuating piston, a rotatable threaded shaft for translating rotational motion to axial motion operatively connected to the actuating piston, a fluid-filled chamber between the actuated and actuating pistons defining a fluid link therebetween whereby axial movement of the actuating piston causes axial movement of the actuated piston, wear take-up and anti-drag structure for permitting substantially free forward movement of the actuated piston in unison with the actuating piston and for limiting retraction of the actuated piston to a predetermined maximum distance, and a fluid supply contained within the cylinder for supplying additional fluid to the chamber in response to retraction of the actuating piston a distance greater than the predetermined maximum for the actuated piston to thereby accommodate the increase in volume of the chamber occasioned by the resultant separation of the pistons.

The invention further includes stop members for preventing transverse deflection of the brake shoe when the brakes are applied, structure for permitting compound motion of the brake shoe to accommodate uneven brake pad wear between the inside and outside brake pads in an assembly including a cone disc, and structure for attaching the brake pads to the brake shoe to increase resistance to shear forces so that an inexpensive adhesive may be used to bond the pads to the shoes.

14 Claims, 5 Drawing Figures

BRAKE ACTUATOR ASSEMBLY

This invention relates to a brake system for vehicles and is particularly adapted for use in trucks and automobiles.

Heretofore, the design of brake cylinders for vehicle brake assemblies has been dependent upon the particular brake power system with which the vehicle is equipped. In the case of automobiles, which are normally equipped with an hydraulic brake system, an hydraulic brake cylinder is employed. Hydraulic fluid is introduced into the brake cylinder from an external source, such as a master cylinder, upon depressing a brake pedal. The pressure of the hydraulic fluid forces a braking element into braking engagement with a rotating member, such as, a brake drum or rotor, on the vehicle wheel. In the case of air brakes, which are normally employed on large trucks, the brake cylinder comprises an air cylinder for receiving compressed air to actuate a piston which in turn moves a brake shoe into engagement with a rotating member. In both systems, fluid from an external source enters and exits a brake cylinder to operate the brakes. Consequently, the design of the brake cylinder is dependant upon the type of fluid employed in the brake system.

Particular problems are encountered with air-operated truck brakes due to the size of the air cylinders necessary to provide sufficient braking force. It is conventional practice to mount such air cylinders on the axle of the vehicle adjacent the wheel. Mounting the air cylinder on the axle is extremely difficult due to the size of the air cylinder and limitations in available space. In addition to initial packaging problems, subsequent access to the brake and wheel assemblies for maintenance purposes is hampered. It is, therefore, desirable to replace the conventional air cylinders with a more compact unit. It is necessary to do this, however, without sacrificing braking force. Since it is undesirable to eliminate air pressure as the primary means for actuating the brakes in truck brake systems, It is necessary to provide a substitute brake actuator assembly which can convert the energy provided by the air pressure into a more efficient form.

The closest known device to the instant invention is the brake actuator disclosed in the U.S. Pat. No. 3,643,763 issued Feb. 22, 1972. It will become apparent, however, that this device does not suggest the concept of the instant invention since it is dependant upon an external source of hydraulic fluid for proper functioning.

The instant invention provides a self-contained brake actuator assembly which may be operated by either an air, hydraulic, or mechanical system. In other words, the operation of the brake actuator assembly of the instant invention is divorced from the external power system so that it may be operated by any of the common brake systems. For this purpose, the brake actuator assembly includes a cylinder, an actuated piston within the cylinder for engaging a brake shoe, an actuating piston, a rotatable threaded shaft member for translating rotational motion to axial motion operatively connected to the actuating piston, and means for rotating the shaft member. The means for rotating the shaft member comprises a lever, or other suitable device for applying a torsional force to the shaft member, which may be operated by an air cylinder, a hydraulic cylinder, or a mechanical force transmitting element. Accordingly, it is possible to eliminate the conventional air cylinder or hydraulic cylinder in brake systems and replace the same with the actuator of the instant invention. Due to the efficiency of the brake actuator, its overall size is substantially less than the air cylinders employed in truck brake systems. Therefore, the use of this invention is especially attractive in truck brake systems.

As in all brake systems, it is desirable to provide automatic adjustment of the brake shoes to accommodate wear in the brake pads. Moreover, it is necessary to prevent continuous drag of the brake pads on the rotating friction member to eliminate overheating of the brake elements. Accordingly, the brake actuator assembly of the instant invention includes wear take-up and anti-drag means for permitting substantially free forward movement of the actuated piston in unison with the actuating piston and for limiting retraction of the actuated piston to a predetermined maximum distance. In short, the actuated piston is permitted to move outwardly, toward the rotating friction member, independently of the position of the actuating piston to accommodate wear in the brake pads. In order that the brake actuator assembly be truly self-contained, the assembly includes fluid supply means contained within the cylinder for supplying additional fluid to the chamber in response to retraction of the actuating piston a distance greater than the predetermined maximum for the actuated piston to thereby accommodate the increase in volume of the chamber occasioned by the resultant separation of the pistons.

Since the invention is particularly applicable to brake assemblies which include an annular, conical brake disc, specific features of the invention are provided for solving problems peculiar to brake assemblies employing friction discs of this specific configuration. For example, due to the transverse forces experienced by the brake shoes when they engage the rotating cone disc there is a strong tendency for the brake shoes to move in the direction of rotation. To prevent this from occurring, the brake assembly includes flanking stop members for preventing sidewise deflection of the brake shoes. Additionally, attaching the brake pads to the brake shoes has always been a difficult and expensive procedure. The connection must be extremely strong due, again, to the transverse forces experienced when the brakes are applied. The shear forces created would strip the brake pads off of the brake shoes without a strong connection. Heretofore, the brake pads have been attached to the brake shoes by rivets, bolts and/or adhesives. This is a relatively expensive procedure. The instant invention provides a less expensive yet dependable connection for the brake pads. More specifically, the brake shoes include one or more indentations or depressions and the brake pads include an equal number of mating embossments which fit into the indentations. Since the interfitting relationship between the brake pads and brake shoes are capable of withstanding a large portion of the shear forces, it is only necessary to use a common adhesive to glue the pads to the shoes. Specific details of these features will become more apparent by reference to the detailed description of the invention contained herein.

Other advantages of the present invention will be readily appreciated as the same becomes better understood by reference to the following detailed description when considered in connection with the accompanying drawings wherein.

Figure 2:
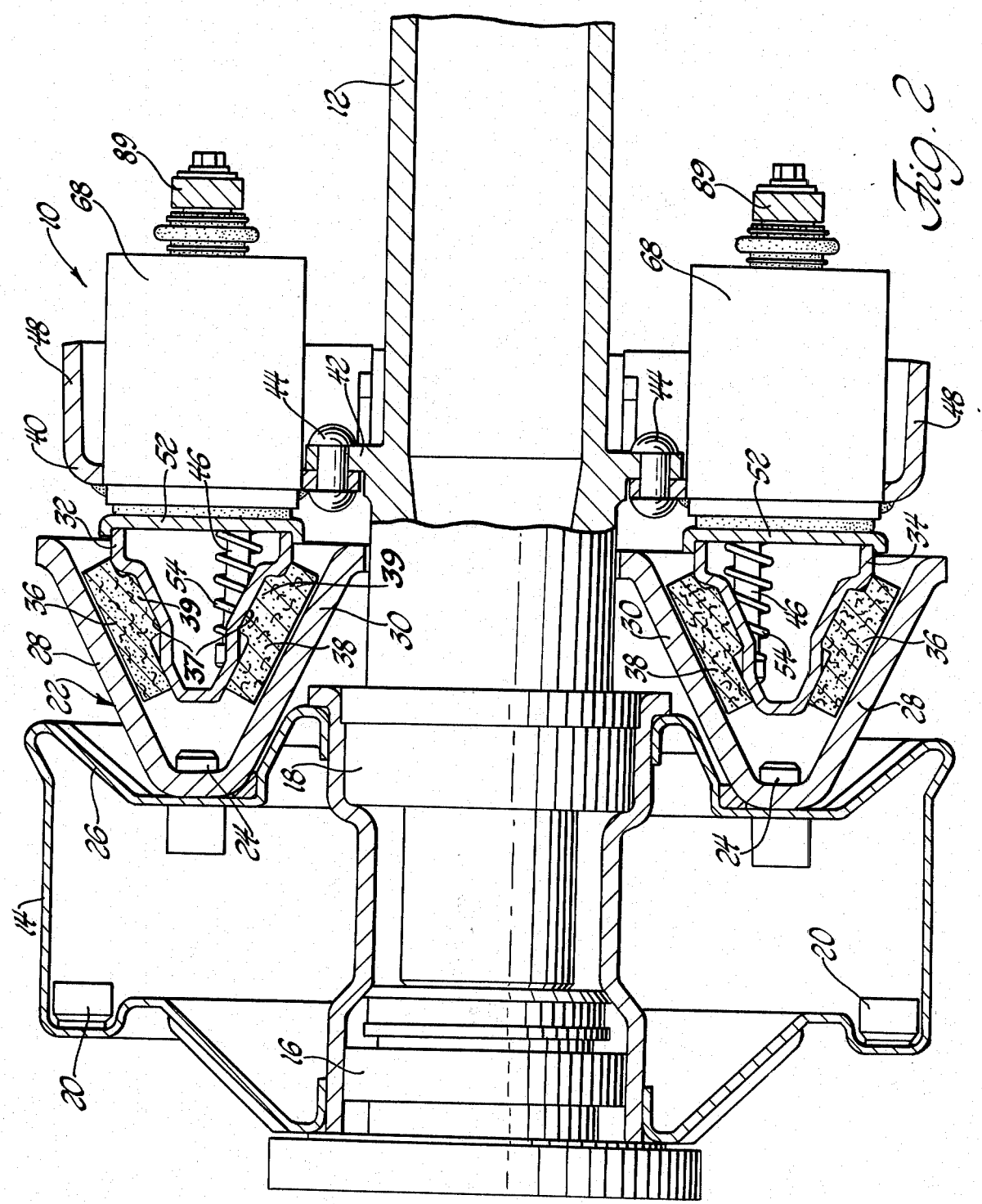
FIG. 2 is a cross-sectional view taken generally along line 2—2 of FIG. 1.

Referring to the drawings, and particularly to FIG. 2, a brake assembly constructed in accordance with the instant invention is generally shown at 10. Since the invention is particularly suitable for use in large trucks, as shown and described herein, the brake assembly 10 is incorporated in the air brake system of a truck. The conventional elements of the truck shown include a truck axle 12 which carries a wheel 14 on suitable bearings 16 and 18. The wheel 14 is of the demountable rim type. That is, the wheel 14 is adapted to receive a pair of rim-mounted tires. The tires are held on the wheel 14 by retainers (not shown) which are bolted to threaded receivers 20 welded to the wheel 14. The demountable rim wheel 14 is one of the standard assemblies employed to mount truck tires on an axle. The invention is equally applicable, however, to assemblies which include a hub for receiving a wheel and tire combination rather than the demountable rim wheel 14.

A friction disc, generally indicated at 22, is attached by suitable fasteners 24 to the interior web 26 of the wheel 14. The friction disc 22 comprises an annular, conical member having a pair of continuous, relatively diverging friction surfaces 28 and 30. The friction disc 22 is sometimes referred to as a "cone disc" since, in transverse cross-section, the walls of the friction disc 22 define a truncated cone.

Figure 1:
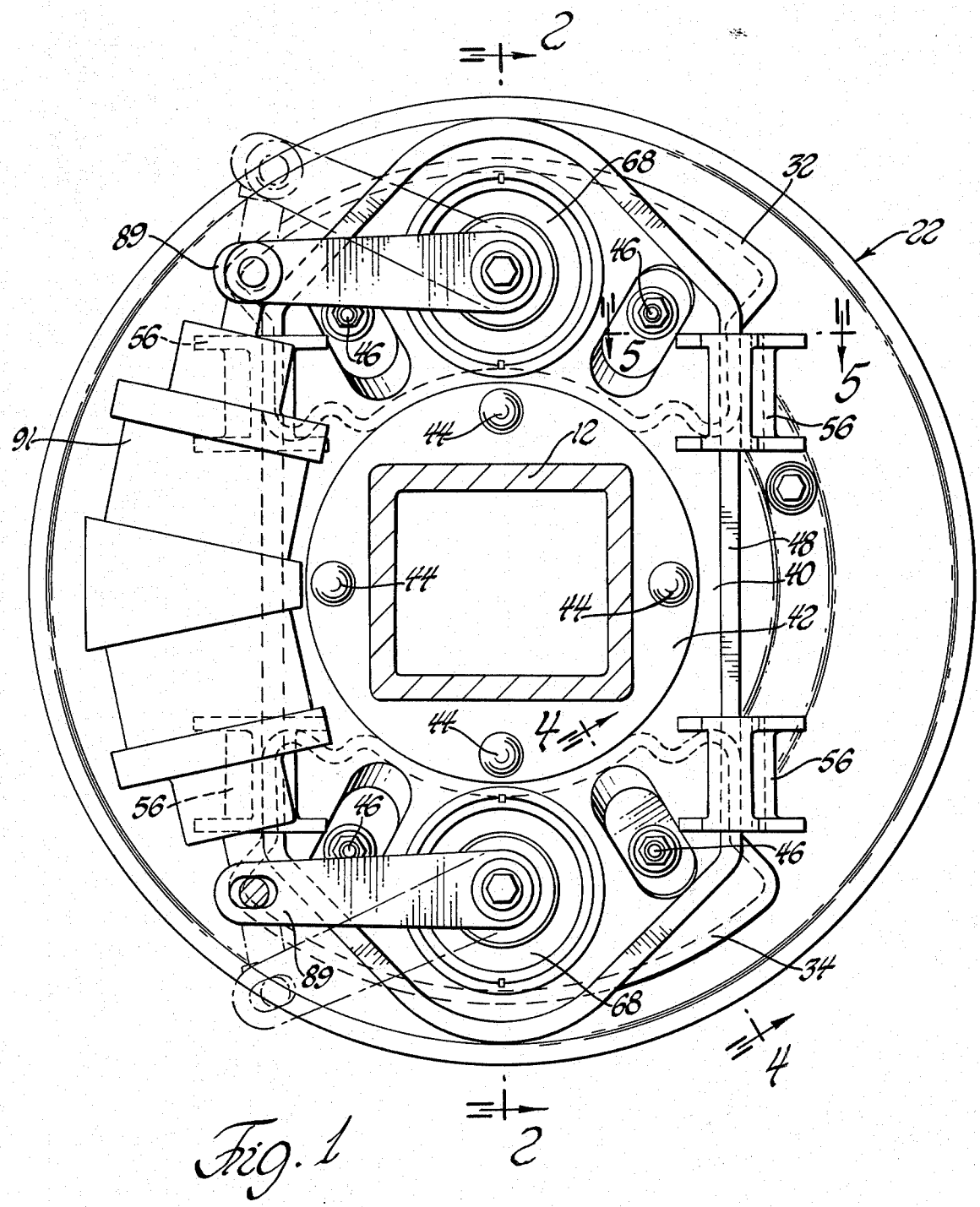
FIG. 1 is an elevational view of a brake assembly constructed in accordance with the instant invention.

In the assembly shown, a pair of wedge-shaped brake shoes 32 and 34 are mounted at diametrically opposed positions with respect to the friction disc 22. Each of the brake shoes 32 and 34 carry a pair of brake pads 36 and 38, one being attached to each of the two sloped surfaces of the brake shoe. As shown in FIG. 1, the brake shoes 32 and 34 and brake pads are curved to conform to the curvature of the friction disc 22. The brake pads 36 and 38 on each of the brake shoes 32 and 34 are, of course, adapted to frictionally engage the friction surfaces 28 and 30 on the friction disc 22.

In order to provide a secure connection between the brake pads 36 and 38 and the brake shoes 32 and 34, the brake shoes include one or more indentations or depressions 37. Preferably a plurality of parallel indentations 37 are formed in the sloped surfaces of the brake shoes. The brake pads 36 and 38 include an equal number of embossments 39 which fit into the indentations 37. The interfitting connection thus established is capable of withstanding the shear forces generated when the brake pads are moved into engagement with the friction disc 22. Consequently, it is only necessary to employ a common adhesive to secure the brake pads to the brake shoes.

A support plate 40 for supporting the brake shoes and other elements of the assembly is mounted adjacent the friction disc 22. For this purpose, the axle 12 includes a flange 42 to which the support plate 40 is fastened in any suitable fashion, such as, by means of rivets 44. The support plate 40 is generally cup-shaped in that it includes a peripheral wall 48 extending away from the friction disc 22.

The brake shoes 32 and 34 are guided and supported by the support plate 40. In order to guide the brake shoes 32 and 34, a pair of guide pins 46 are provided which extend from the support plate through openings 50 in the rear wall 52 of the brake shoes. The brake shoes are slidable with respect to the guide pins to that they may move toward and away from the friction disc 22 along a path generally established by the pins. Each of the guide pins 46 is surrounded by a coil spring member 54. The coil spring members 54 are compressed between the heads of the pins and the rear wall 52 when the brake shoes 32 and 34 move toward the friction disc 22. Consequently, the spring members 46 urge the brake shoes 32 and 34 toward the support plate 40; that is, they tend to move the friction pads 36 and 38 out of frictional engagement with the friction disc 22. The coil spring members 46 function as return spring means for urging the brake shoes 32 and 34 toward an unengaged position away from the friction disc 22. As will be described hereinafter, such return spring means cooperates with anti-drag means to prevent continuous frictional engagement of the brake pads with the friction disc when the brakes are not actuated.

Figure 5:
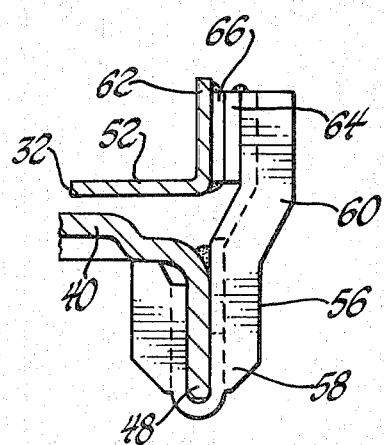
FIG. 5 is a view taken generally along line 5—5 of FIG. 1.

It has been discovered that, upon application of a braking force, the brake shoes 32 and 34 are subjected to high-transverse loads. That is, due to the inertia of the rotating friction disc, a transverse or side load is applied to the brake shoes 32 and 34 in the direction of rotation of the friction disc 22 when frictional engagement is established between the brake pads 36 and 38 and the friction disc 22. In order to withstand such transverse loads and to prevent transverse motion of the brake shoe, a stop member 56 is provided along each side of the brake shoes 32 and 34. The stop members 56 prevent sidewise deflection or movement of the brake shoes. As shown in FIG. 5, each of the stop members 56 includes a U-shaped portion 58 which is positioned over, or straddles, the peripheral wall 48 of the support plate 40. A permanent connection is established by welding the U-shaped portion to the wall 48. A leg member 60 extends from the U-shaped portion 58 and terminates adjacent the brake shoe 32. Both the leg member 60 and the side 62 of the brake shoe 32 carry a wear pad 64 and 66. The wear pads 64 and 66 are in sliding contact with one another to permit movement of the brake shoes 32 and 34 toward and away from the support plate 40. However, transverse or sidewise motion of the brake shoe is prevented. As viewed in FIG. 5, transverse motion of the brake shoe 32 would be toward the left.

Another problem with cone disc brakes, such as the friction disc 22, is that the surface speed of the outer surface 28 is greater than the surface speed of the inner surface 30. This is due to the difference in distance from the axis of rotation of the friction disc. Consequently, the rate at which wear occurs in the brake pad 36 which engages the faster moving surface 28 is greater than the wear rate of the brake pad 38 engaging the slower moving surface 30. If this difference in wear rates is not taken into consideration, the inner brake pads 38 will eventually be exerting the bulk of the braking force. This unbalanced braking force can cause deflection of the brake shoes. Additionally, since both brake pads of the brake shoes are not contacting the friction surface, a reduction in braking force will be experienced.

Figure 4:
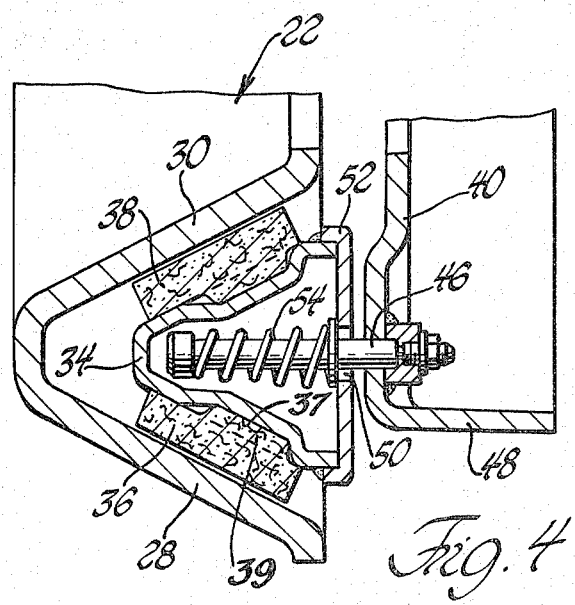
FIG. 4 is a view taken generally along line 4—4 of FIG. 1.

It has been discovered that this problem can be substantially eliminated by permitting two-component motion of the brake shoes 32 and 34. In other words, the brake shoes 32 and 34 must be free not only to move axially with respect to the friction disc 22, but also radially thereof. In order to permit compound or two-component motion of the brake shoes, the openings 50 in the rear wall 52 of the brake shoes, through which the guide pins 46 extends, are elongated in the radial direction. In other words, the openings 50 have at least one dimension greater than the diameter of the guide pins 46. As shown in FIG. 4, the brake shoe 34 is thus permitted to move radially outwardly with respect to the friction disc 22 until the guide pins 46 engage the side walls of the enlarged openings 50. Such outward radial movement is sufficient to accommodate the uneven rate of wear in the two brake pads 36 and 38.

Each of the brake shoes 32 and 34 includes a self-contained actuator 68 for urging the respective brake shoe toward the friction disc 22. As used herein, "self-contained" means that the brake actuator does not require introduction of a fluid, such as air or hydraulic fluid, into the actuator from an external source in order to effect actuation of the brakes. Viewed externally, the only input required to actuate the brakes with the brake actuator assembly is a torsional force applied to a shaft member. This torsional force may be applied in any convenient manner. As will be seen in the following description, air cyclinders are employed to move a lever which is splined to the shaft. Alternatively, the lever may be moved by means of a hydraulic piston, or by a simple mechanical force transmitting device. In short, the operation of the brake actuator assembly is divorced from the specific type of brake system employed in the vehicle. Accordingly, the brake actuator assembly of the instant invention may be employed in vehicles having either air or hydraulic brake systems.

Figure 3:
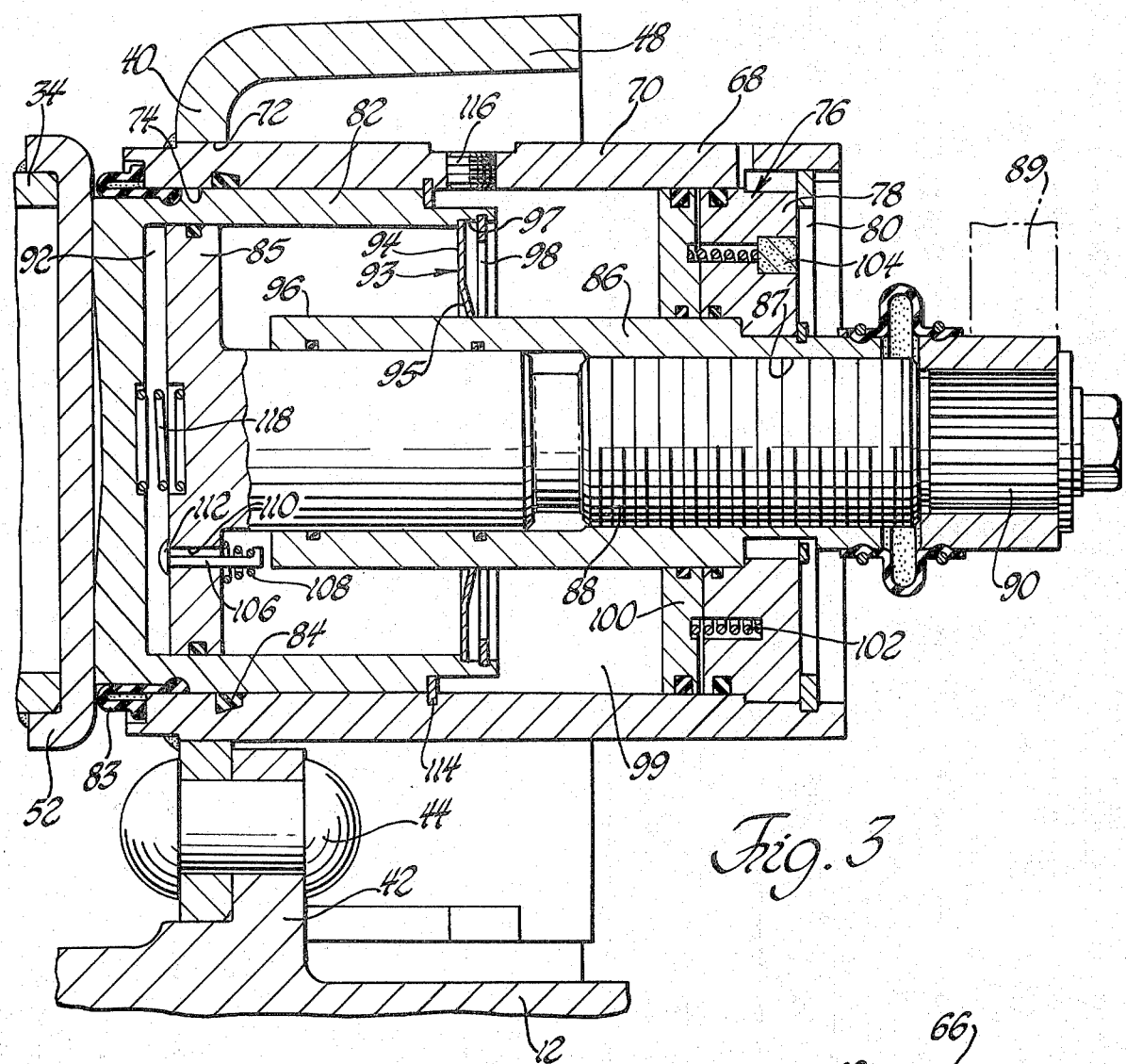
FIG. 3 is a cross-sectional, elevational view of a brake actuator assembly constructed in accordance with the instant invention.

Referring particularly to FIG. 3, the brake actuator assembly 68 includes a cylinder 70 which is secured in an opening 72 in the support plate 40 in any suitable fashion, such as, by welding. The cylinder 70 includes an open end 74 and a closed end generally indicated at 76. The closed end 76 is closed by means of a closure plate 78 which is held in place by means of a snap ring 80. An actuated piston 82 is disposed at the open end of the cylinder 70. The actuated piston 82 engages the rear wall 52 of the brake shoe, in this case, brake shoe 34. A suitable dust boot 83 and seal 84 are employed to seal the actuated piston 82 with the cylinder 70. An actuating piston 85 is disposed rearwardly of the actuated piston 82, and, as shown, is located within its hollow interior so that its outer periphery is in sealing engagement with the walls of the actuated piston 82. A sleeve member 86 opens into the cylinder 70 and is supported in an opening extending through the closure plate 78. The sleeve member 86 includes internal threads at one end 87 and is adapted to receive a threaded shaft member 88. The shaft member 88 is mounted for rotation within the sleeve member 86 and is also operatively connected to the actuating piston 85. The threaded shaft member 88 serves as a power screw for translating rotational motion to axial motion. In other words, rotational motion of the threaded shaft member 88 causes axial motion of the actuating piston 85.

In order to rotate the threaded shaft member 88, a lever 89 is attached to the splined end 90 of the shaft 88 which extends through the closure plate 78. As shown in FIG. 1, the levers 89 for both of the brake actuator assemblies 68 extend in the same direction. A suitable dual-acting air cylinder 91 is interposed between the two levers 89 to move the same in a short arcuate path. The extreme positions of the levers are shown in phantom in FIG. 1. Such angular motion rotates the threaded shaft members 88 of each of the brake actuator assemblies 68. The shaft members 88 are thus moved axially in the sleeves 86 to axially move the actuating pistons 85. To enable the actuating pistons 85 to move in the same direction at the same time, oppositely threaded shaft members and sleeves are employed.

Due to the mechanical advantage gained by employing the lever 89 and threaded shaft member 88, a substantially smaller air cylinder may be employed to actuate the brake system than in conventional air-brake systems heretofore employed. A substantial advantage can thus be obtained by employing this brake actuator in truck brake systems rather than the conventional air cylinder.

As alluded to above, brake pad wear necessitates periodic progressive movement of the actuated piston 82 toward the friction disc 22. Since the maximum stroke of the actuating piston 85 is fixed, the actuated piston 82 must be capable of moving outwardly independently of the actuating piston 85 to accommodate brake pad wear. The maximum stroke of the actuating piston 85 is "fixed" in the sense that the total axial distance it may move is a function of the angular movement of the levers 89. It is also essential that the actuated piston 82 move simultaneously with the actuating piston 85 when the brakes are applied. Thus, a connection between the actuated and actuating pistons 82 and 85 must at all times be maintained. To accomplish this, a chamber 92 filled with an incompressible fluid is established between the actuated and actuating pistons 82 and 85. The fluid-filled chamber 92 comprises a fluid link between the pistons such that axial movement of the actuating piston 85 results in immediate axial movement of the actuated piston 82. It is noted that the distance between the pistons can be increased without reaction lag as long as the chamber 92 remains filled.

As suggested, the brake actuator assembly also includes wear take-up and anti-drag means. Such means permits substantially free forward movement of the actuated piston 82 in unison with the actuating piston 85 and also limits retraction of the actuated piston 82 to a predetermined maximum distance. More specifically, the wear take-up and anti-drag means includes one-way clutch means generally indicated at 93 for resisting retraction of the actuated piston 82. The one-way clutch means includes an annular gripping member 94 having inwardly and rearwardly extending inclined fingers 95 which engage the outer surface 96 of the sleeve member 86. As shown in FIG. 3, the annular gripping member 94 can move relatively freely in a direction toward the friction disc 22 (toward the left as shown in FIG. 3), but is prevented from moving away from the friction disc 22 (toward the right as shown in FIG. 3) due to the gripping engagement of the inclined fingers 95 with the surface 96 of the sleeve member 86.

The wear take-up and anti-drag means also includes lost motion means for permitting limited movement of the actuated piston 82 independently of the one-way clutch means 93. The lost motion means includes an internal groove 97 in the walls of the actuated piston 82 for receiving the annular gripping member 94. The groove 97 defines a pair of shoulders which are spaced apart a distance greater than the thickness of the gripping member 94 to permit limited relative movement between the actuated piston 82 and the gripping member 94. For convenience of the assembly, the actuated piston 82 includes a snap ring member 98 which defines one shoulder of the internal groove 97. The snap ring member 98 is provided for assembly purposes and retains the gripping member 94 in the groove 97.

Since the wear take-up function requires outward movement of the actuated piston 82 independently of the actuating piston 85, the volume of the chamber 92 will increase. Accordingly, the brake actuator assembly 68 includes fluid supply means contained within the cylinder 70 for supplying additional fluid to the chamber 92 in response to retraction of the actuating piston 85 a distance greater than the predetermined maximum for the actuated piston 82 to thereby accommodate the increase in volume of the chamber 92 occasioned by the resultant separation of the pistons. The fluid supply means includes a fluid reservoir 99 within the cylinder 70. In effect, the entire free volume behind the actuating piston 85 comprises the reservoir 99. Pressurization means is provided for constantly maintaining the fluid contained in the reservoir 99 under pressure. Such means includes a displacement piston 100 and a spring member 102 disposed between the displacement piston 100 and the closure plate 78. The spring member 102 comprises means for urging the displacement piston 100 against the body of fluid contained in the reservoir 99. Although a coil spring member 102 is employed to urge the displacement piston 100 against the body of fluid in the reservoir 99, it is contemplated that other means may be employed to accomplish this function. For example, air or hydraulic pressure may be introduced between the displacement piston 100 and the closure plate 78 to constantly urge the displacement piston 100 toward the left as viewed in FIG. 3. One or more breather ports 104 are provided which are filled with a suitable air permeable filter material. The breather ports 104 communicate with the rear face of the displacement piston 100 to prevent the creation of a vacuum between the displacement piston 100 and the closure plate 78 which would interfere with free movement of the displacement piston 100 against the fluid in the reservoir 99.

In order to permit passage of fluid from the reservoir 99 into the chamber 92 a one-way check valve 106 is provided in the actuating piston 85. As will be hereinafter described, under certain circumstances, fluid pressure on the right side of the actuating piston 85 will overcome the force of the coil spring 108 and cause fluid to flow through passage 110 into the chamber 92. It is noted that, due to the sealing head 112 on the stem of the check valve 106 the reverse flow of fluid, that is, flow of fluid from the chamber 92 into the reservoir 99, is never permitted. Escape of fluid from the chamber 92 is thus prevented.

The brake assembly described above operates as follows. Initially, the arrangement of parts are generally as shown in FIG. 3. That is, when the brake pads 36 and 38 are new and have not been subjected to wear, the actuated piston 82 abuts a stop ring 114 which establishes an absolute maximum retraction of the actuated piston 82 into the cylinder 70. The stop ring 114 is provided mainly for assembly purposes to establish an initial location of the actuated piston 82. When the lever 89 is rotated, in this case, by means of the air cylinder 91, the threaded shaft 88 rotates within the threaded sleeve 86 causing the threaded shaft 88 to move toward the friction disc 22. Such movement causes axial movement of the actuating piston 85 and also the actuated piston 82 due to the fluid link between these pistons which is defined by the fluid-filled chamber 92. Since the brake shoes are always maintained against the actuated pistons by means of the return springs 54, axial movement of the actuated piston 82 toward the friction disc 22 forces similar movement of the brake shoe 34 thus moving the brake pads into engagement with the friction surfaces 28 and 30. Consequently, a braking force is applied to the friction disc 22.

The braking force is released by rotating the lever 89 in the opposite direction. This results in a retraction of the actuating piston 85. Simultaneously the actuated piston 82 is also forced to retract by means of the return springs 54 and the suction between the actuating and actuated pistons.

Forward axial movement of the actuated piston 82 moves the snap ring 98 toward the annular gripping member 94. If the distance traveled by the actuated piston 82 is less than, or just equal to, the distance between the gripping member 94 and the snap ring 98, the gripping member 94 will not be moved. Accordingly, when the brakes are released by rotating the lever 98 in the opposite direction, both the actuated and actuating pistons 82 and 85 will be retracted an equal distance. The volume of the chamber 92 will not increase under these circumstances. It is noted that positive retraction of the actuated piston 82 is caused by the return springs 54 which act upon the brake shoe to urge it toward the support plate 40.

After repeated application of the brakes wear in the brake pads will occur and the actuated piston 82 will eventually move a distance sufficient to bring the snap ring 98 into engagement with the gripping member 94. Any further movement of the actuated piston 82 moves the gripping member 94 toward the friction disc 22, or toward the left as shown in FIG. 3. Upon retraction of the pistons 82 and 85 when the brakes are released, the inner shoulder of the recess 97 in the actuated piston 82 will engage the annular gripping member 94 before the actuating piston 85 reaches its unengaged position. The annular gripping member 94 prevents the actuated piston 82 from returning all the way to the position it occupied prior to application of the brakes. Since the stroke of the actuating piston 85 is relatively fixed or constant, it will continue to move after motion of the actuated piston 82 ceases. The resulting separation of the two pistons 82 and 85 will tend to increase the volume of the chamber 92. Since the chamber 92 is sealed, such separation will create a suction within the chamber 92. The force created is sufficient to overcome the force of the spring 108 of the check valve 106. The suction force within the chamber 92 is, of course, augmented by the pressure maintained upon the body of fluid in the reservoir 99 due to the displacement piston 100. When the check valve opens, fluid from the reservoir 99 will be forced into the chamber 92 by the displacement piston 100 thus filling the chamber 92 to permit separation of the actuating piston 85 from the actuated piston 82. The actuating piston 85 can thus return to its starting or initial position.

The lost motion connection defined by the groove 97 limits the retraction of the actuated piston 82 a predetermined maximum distance. This prevents continuous drag between the brake pads and the friction disc. If the forward stroke of the pistons exceed this predetermined maximum distance, the gripping member 94 will be moved along the surface of the sleeve member 96 a distance equal to the excess over the predetermined maximum. When the brakes are released, and retraction occurs, the actuated piston 82 is permitted to retract only an amount equal to the predetermined maximum which is defined by the groove 97. The actuating piston 85, however, is retracted the full distance which it travelled, a distance which is greater than the predetermined maximum. Whenever this occurs the two pistons are separated. The increase in volume of the chamber 92 occasioned by such separation is accommodated in the above described manner by the fluid supply means. The actuated piston 82 is, therefore, free to move outwardly as wear occurs in the brake pads. As such outward movement of the actuated piston 82 takes place, the volume of the chamber 92 will increase. As the volume of the chamber 92 increases it will be filled with fluid by the combination of the check valve and displacement piston 100.

The cylinder 70 includes a bleed port 116 for bleeding air out of the cylinder 70. Moreover, additional ports, similar to the bleed port 116, may be provided for initially filling the chamber 92 and reservoir 99 with fluid. A coil spring 118 may also be provided between the actuated piston 82 and the actuating piston 85 to establish the initial separation between the two pistons. Once this initial displacement has been established, the coil spring 118 no longer takes an active part in the operation of the brake actuator assembly.

As suggested above, the brake actuator assembly is particularly suited for use in truck air brake systems. The conventional air cylinders used to actuate the brakes are replaced by the brake actuator of the instant invention which is a much more compact unit. Relatively small air cylinders may then be used to operate the levers due to the mechanical advantage obtained.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A self-contained brake actuator assembly comprising: a cylinder, an actuated piston within said cylinder, an actuating piston, a rotatable threaded shaft member for translating rotational motion to axial motion operatively connected to said actuating piston, means for rotating said shaft member, a fluid-filled chamber between said actuated and actuating pistons defining a fluid link therebetween whereby axial movement of said actuating piston causes axial movement of said actuated piston, wear take-up and anti-drag means for permitting substantially free forward movement of said actuated piston in unison with said actuating piston and for limiting retraction of said actuated piston to a predetermined maximum distance, and fluid supply means contained solely within said cylinder and acting as the only source for supplying additional fluid to said chamber in response to retraction of said actuating piston a distance greater than the predetermined maximum for said actuated piston to thereby accommodate the increase in volume of said chamber occasioned by the resultant separation of said pistons, said shaft member being the only input for actuating said assembly.

2. An assembly as set forth in claim 1 wherein said fluid supply means includes a fluid reservoir within said cylinder, pressurization means for constantly maintaining the fluid contained in said reservoir under pressure, and a check valve between said reservoir and said chamber for permitting passage of fluid from said reservoir into said chamber.

3. An assembly as set forth in claim 2 wherein said wear take-up and anti-drag means includes one-way clutch means for resisting retraction of said actuated piston and lost motion means for permitting limited movement of said actuated piston independently of said one-way clutch means.

4. An assembly as set forth in claim 2 wherein said pressurization means includes a displacement piston and means for urging said piston against the fluid in said reservoir.

5. A self-contained brake actuator assembly comprising: a cylinder having an open end and a closed end, an actuated piston disposed at said open end, an actuating piston within said cylinder located rearwardly of said actuated piston, a sleeve member opening into said cylinder at said closed end, a threaded shaft member mounted for rotation within said sleeve member and connected to said actuating piston for translating rotational motion to axial motion, means for rotating said shaft member, a fluid-filled chamber between said actuated and actuating pistons defining a fluid link therebetween whereby axial movement of said actuating piston causes axial movement of said actuated piston, wear take-up and anti-drag means for permitting substantially free forward movement of said actuated piston in unison with said actuating piston and for limiting retraction of said actuated piston to a predetermined maximum distance, and fluid supply means contained solely within said cylinder and acting as the only source for supplying additional fluid to said chamber in response to retraction of said actuating piston a distance greater than the predetermined maximum for said actuated piston to thereby accommodate the increase in volume of said chamber occasioned by the resultant separation of said pistons, said shaft member being the only input actuating said assembly.

6. An assembly as set forth in claim 5 wherein said fluid supply means includes a fluid reservoir within said cylinder, a displacement piston, means for urging said displacement piston against the body of fluid contained in said reservoir, and a check valve between said reservoir and said chamber for permitting passage of fluid from said reservoir into said chamber.

7. An assembly as set forth in claim 6 wherein said wear take-up and anti-drag means includes one-way clutch means for resisting retraction of said actuated piston and lost motion means for permitting limited movement of said actuated piston independently of said one-way clutch means.

8. An assembly as set forth in claim 7 wherein said one-way clutch means includes an annular gripping member having inwardly extending, inclined fingers engaging the outer surface of said sleeve member.

9. An assembly as set forth in claim 8 wherein said lost motion means includes an internal groove in said actuated piston for receiving said annular gripping member, said groove defining a pair of shoulders spaced apart a distance greater than the thickness of said gripping member to permit limited relative movement between said actuated piston and said gripping member.

10. An assembly as set forth in claim 9 wherein said actuated piston includes a snap-ring member defining one shoulder of said internal groove.

11. An assembly as set forth in claim 6 wherein said means for urging said displacement piston against the body of fluid contained in said reservoir includes a spring member acting between said piston and said cylinder.

12. An assembly as set forth in claim 11 wherein said cylinder includes breather ports communicating with the rear face of said displacement piston.

13. An assembly as set forth in claim 5 wherein said means for rotating said shaft member includes a lever and power means for operating said lever.

14. An assembly as set forth in claim 13 wherein said power means includes an air-operated cylinder.

* * * * *